Patented Feb. 19, 1952

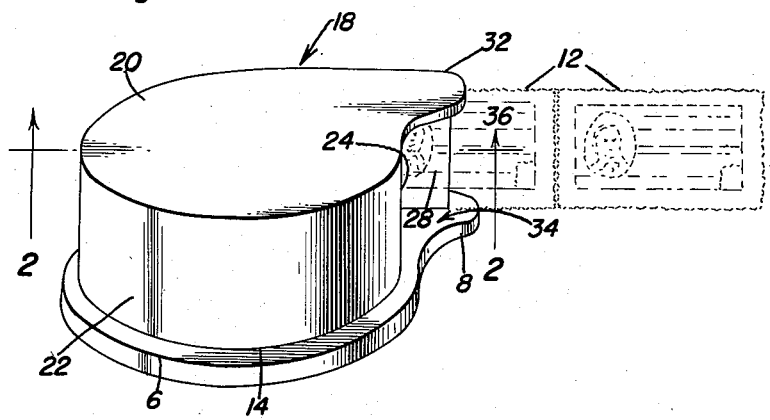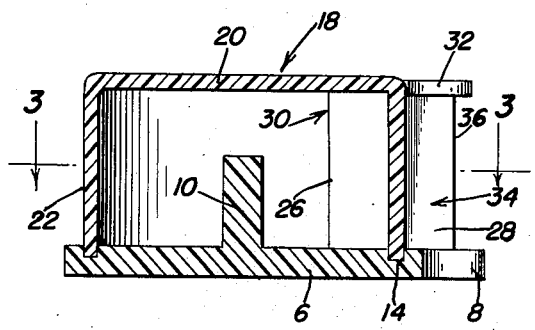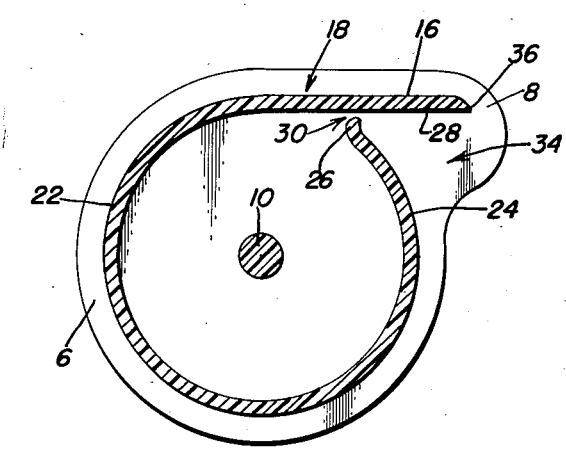

2,586,346

UNITED STATES PATENT OFFICE 2,586,346

HOLDER AND DISPENSER FOR COILED GOODS

Harry W. King, Sycamore, Ill.

Application February 3, 1950, Serial No. 142,125

2 Claims. (Cl. 242—55.5)

The present invention relates to certain new and useful improvements in holding and dispensing containers for coiled goods, such as those put up for sale in rolled strip form and while satisfactorily employable for ribbons and tapes, is primarily designed for use as a simple holder and dispenser for postage stamps.

There has long existed a recognized need for a simple and practical holder and dispenser for postage stamps. Therefore, the primary object of the instant invention is to provide a unique holder and dispenser in which manufacturers, retailers and users will find their respective requirements and needs fully met, contained and conveniently available.

In reducing to practice a preferred embodiment of the inventive concept a simple and serviceable container is provided, the same being characterized by substantially moisture proof container which is preferably made of commercial plastic and which has a restricted dispensing slot through which the free end of the stamp roll is easily withdrawn for severing and detaching the stamps singly or collectively.

More specifically, the invention has to do with the stated container, the latter embodying a flat opaque base and a readily applicable and removable transparent cover, the top of the base having groove means and the cover having rim means which is removably lodged in the groove means, said base having a hub forming stud at its center to expedite the uncoiling and stamp withdrawal steps.

Novelty is predicated on a container having the aforementioned facilities but more desirable in that the rim portion of the container is provided with a novelly formed and designed recess or pocket into which the finger of one hand may be inserted to effectively check the available end of the stamp roll, whereby to enable the remaining hand to be deftly utilized in detaching the stamps one or more at a time.

An equally important object is to keep the gum on the stamps from becoming too soft and sticky in warm and humid weather, to permit the user to keep an eye on the supply from time to time and to put him into a position to replenish the supply before it becomes exhausted.

Other objects and advantages will become more readily apparent from the following description of the accompanying illustrative drawings.

In the accompanying sheet of drawings wherein like numerals are employed to designate like parts throughout the views:

Figure 1 is a perspective view of a holder and dispenser constructed in accordance with the principles of the present invention and showing, in dotted lines, the manner in which same is used;

Figure 2 is a central vertical section on the approximate line 2—2 of Figure 1, looking in the direction of the arrows;

Figure 3 is a horizontal section on the line 3—3 of Figure 2, looking in the direction of the arrows.

The base, which is of general and circular form, is denoted by the numeral 6, is of opaque commercial plastic or equivalent material and has flat top and bottom surfaces. On the right, as shown in Figure 3, the base is provided with a lobe-shaped extension 8. At its center it is provided with a stud which serves as a hub 10 for the roll of stamps 12 (shown in dotted lines in Figure 1). The top side of the base has a substantially circular groove 14 one end of which extends, somewhat tangentially beyond the periphery of the main groove as at 16, this portion being situated within the confines of the lobe extension 8.

The cover, which is of transparent plastic and suitably colored, is denoted by the numeral 18 and this has a substantially flat top 20 and a depending skirt-like rim 22. The major part of the rim is also circular and the circular portions of the rim are removably lodged in the corresponding portions of the groove means 14. One curvate end portion of the rim, the portion 24, terminates in an outwardly flared terminus 26 and this coacts with an extending terminal portion 28 in defining a restricted discharge or dispensing slot 30 for the free end portion of the stamp roll. The extending portion 28 of the rim is also tangent to the main circular portion and is lodged in the tangential portion 16 of the groove. The top portion of the cover also has a lobe-shaped extension 32 which is in spaced parallelism above the extension 8 and which overhangs the slot, rim-end 26 and tangential extension 28 in defining a substantially V-shaped pocket 34. The tip of the tangential extension 28 is suitably bevelled to form what may be designated as a shearing edge 36. The pocket may be said to be made up of a lobe-like bottom ledge 8 and overhanging "roof" and curvate wall 24 and straight backing wall 28. The curvate wall serves to pilot the user's finger into the pocket thus enabling him to press the end of the finger against the stamps to hold the same against the backing wall 28. Thus, by grasping hold of the end of the stamp roll and pulling the stamps out one or more as desired, the stamps may be checked and stopped by inserting the finger in the recess or pocket and forcing the stamp against the backing wall 28. This brings the perforated portion between stamps in alignment with the shearing edge 36 so that each stamp may be cleanly torn off.

The over-all construction is of such simplicity in style and design that its constructional features will be clear merely upon glancing at the drawings. Moreover, the advantages which accrue from the provision of such a unique container will be full well appreciated by those who like to keep stamps in good shape, to keep track of the supply in the container, to be able to readily load the container and to have complete control of its collectively useful features.

Changes in shape, size, materials and rearrangement of details and parts may be resorted to in actual practice, so long as they do not depart from the spirit of the invention or the scope of the appended claims, as is well understood.

Having described the invention, what is claimed as new is:

1. A holder and dispenser for rolled stamps comprising a container, the latter embodying a flat base having a groove in its top, a vertical hub pin and a lobe-shaped marginal extension, a hollow cover having a top and a depending marginal rim, the lower basing edge of said rim being fitted removably into said groove, said rim being primarily circular, having a restricted dispensing slot and a terminal projecting tangentially beyond the rim proper and rising at right angles from said lobe-shaped extension, and said top also having a marginal lobe-shaped extension topping said tangential terminal corresponding to and situated in spaced parallelism above said first mentioned lobe-shaped extension and defining, in conjunction with said latter extension, tangential projection and intervening rim portion, a substantially V-shaped pocket, that portion of the rim, at the crotch of the pocket, having a stamp strip feeding and guiding slot.

2. The structure defined in claim 1, wherein the tip of said terminal has shearing edge to expedite severance and detachment of the stamps as they emerge from said pocket, said shearing edge being located inwardly of the edge portions of said lobe-shaped extensions.

HARRY W. KING.

REFERENCES CITED

The following references are of record in the file of this patent:

UNITED STATES PATENTS

| Number | Name | Date |
| --- | --- | --- |
| 1,026,778 | Toles | May 21, 1912 |
| 1,029,490 | Connors et al. | June 11, 1912 |
| 1,226,928 | Updike | May 22, 1917 |
| 1,718,143 | Hancock | June 18, 1929 |
| 1,912,363 | DeWaide | June 6, 1933 |
| 2,324,204 | Fischer | July 13, 1943 |